United States Patent [19]

Willi

[11] 4,236,857

[45] Dec. 2, 1980

[54] APPARATUS FOR THE CONTINUOUS UNLOADING OF SHIPS

[75] Inventor: Josef Willi, Fischamend, Austria

[73] Assignee: Wiener Bruckenbau und 1 Eisenkonstruktions Atkiengesellschaft, Vienna, Austria

[21] Appl. No.: 944,240

[22] Filed: Sep. 20, 1978

[30] Foreign Application Priority Data

Sep. 21, 1977 [DE] Fed. Rep. of Germany ....... 2742499

[51] Int. Cl.³ .............................................. B65G 63/00
[52] U.S. Cl. ..................................... 414/139; 198/509; 198/519; 414/723
[58] Field of Search ................ 414/139, 143, 144, 723, 414/912; 198/509, 510, 511, 518, 519

[56] References Cited

U.S. PATENT DOCUMENTS

| | | | |
|---|---|---|---|
| 3,243,066 | 3/1966 | Gardner et al. .................. | 414/723 X |
| 3,756,375 | 9/1973 | Briggs ................................. | 198/509 |
| 3,828,915 | 8/1974 | Cox et al. ......................... | 414/139 X |
| 4,003,480 | 1/1977 | Metrier ............................... | 414/139 |

FOREIGN PATENT DOCUMENTS 2217189 11/1972 Fed. Rep. of Germany ........... 198/509
2716014 1/1978 Fed. Rep. of Germany ........... 414/139

Primary Examiner—L. J. Paperner
Attorney, Agent, or Firm—Sprung, Felfe, Horn, Lynch & Kramer

[57] ABSTRACT

An apparatus for the continuous unloading of ships, having a traveling crane and a boom disposed for raising and lowering thereon and bearing a feeder for bulk material that is to be unloaded comprise a bucket elevator including a main frame and a lower section and an endless bucket train having at least one releasable coupling. The lower section has a pulley mechanism joined to the feeder assembly feeding it and is releasably fastened to the main frame so that the lower section of the bucket elevator together with the feeder assembly is removable.

19 Claims, 12 Drawing Figures

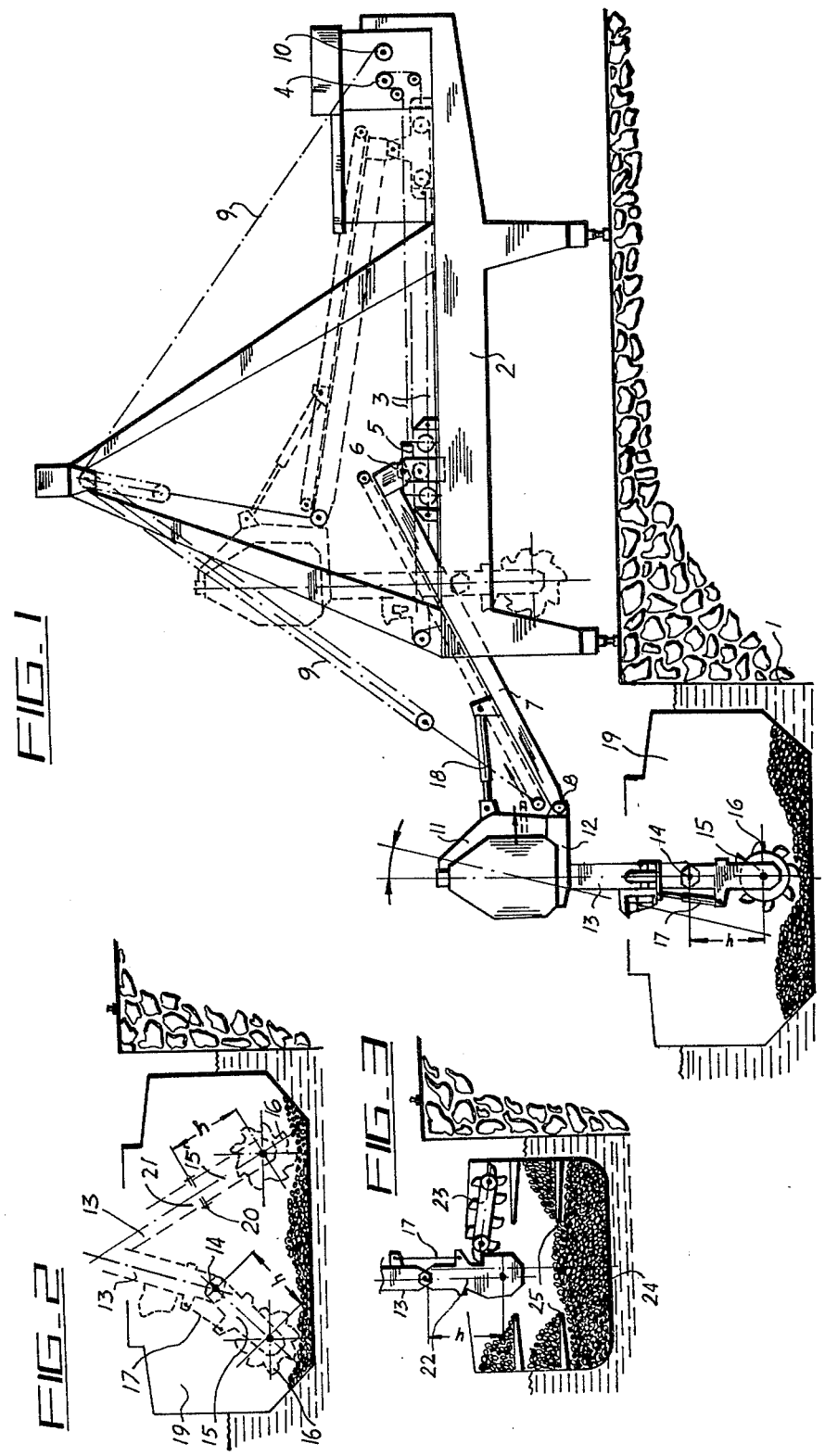

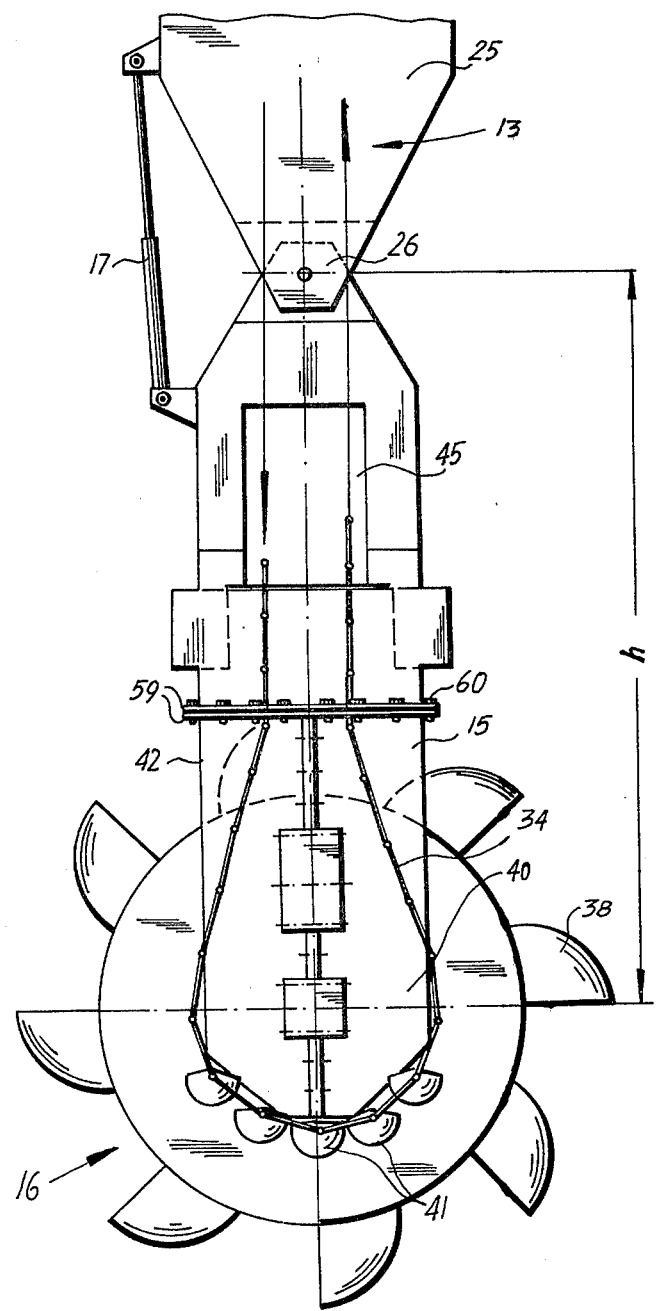

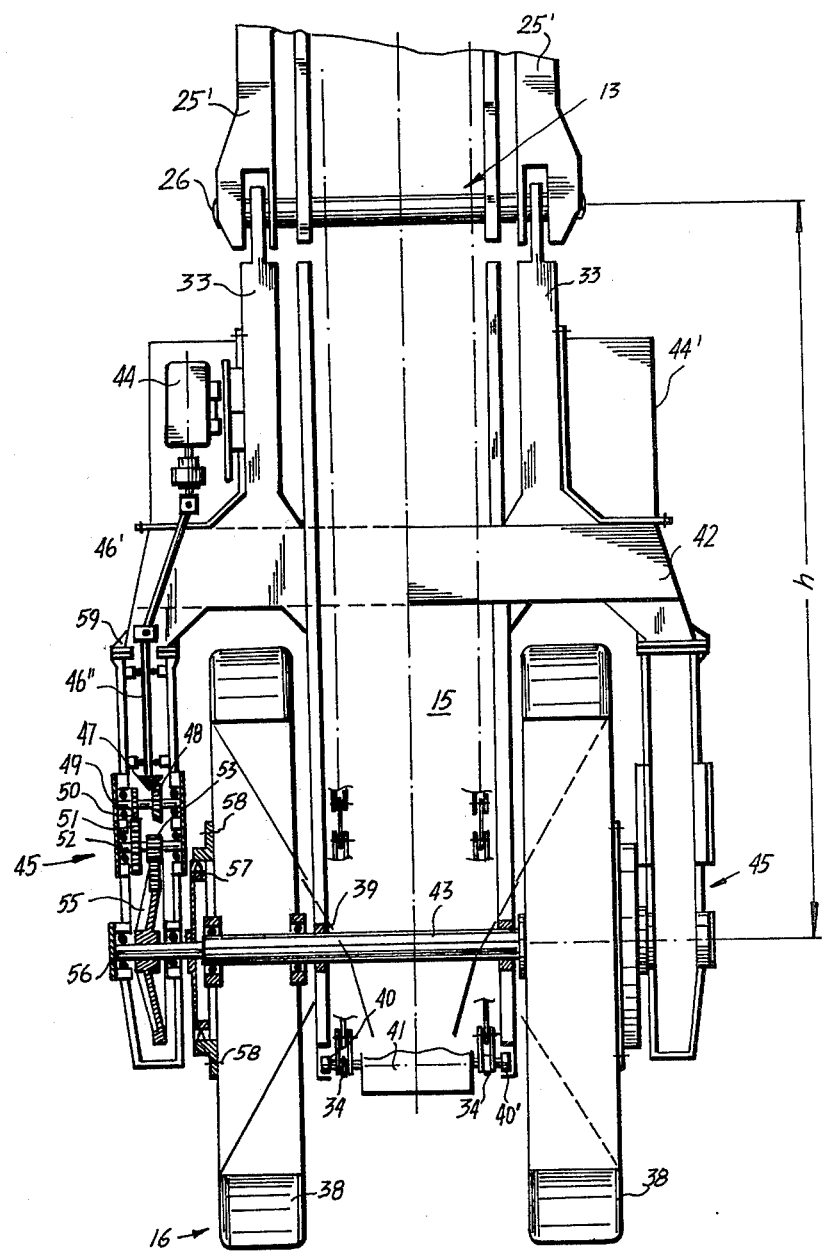

FIG_10
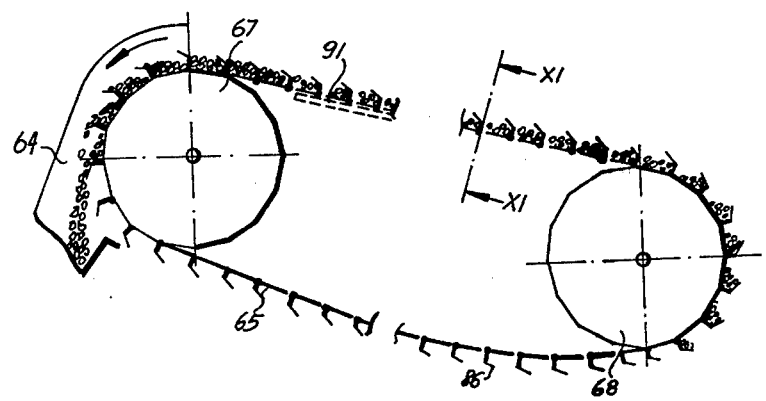
FIG_11
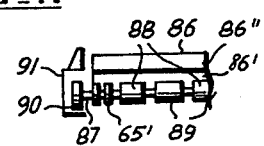

APPARATUS FOR THE CONTINUOUS UNLOADING OF SHIPS

BACKGROUND

The invention relates to an apparatus for the continuous unloading of ships, having a traveling portal crane and a boom disposed for raising and lowering thereon and having an endless bucket elevator and a feeder which is a device for shoveling up the bulk material that is to be unloaded.

Such a ship unloading apparatus is known, for example, from German Pat. No. 2,342,322. The known apparatus have above all the disadvantage of poor adaptability to different ship sizes and to different bulk materials. Furthermore, their maneuverability in most cases is insufficient to enable the feeder to reach the less accessible areas of the ship's hold.

THE INVENTION

The object of the invention is to create an apparatus of the above-mentioned kind which will be universally applicable to all sizes of ships and all types of bulk materials. The apparatus of the invention is to make possible a high rate of unloading in all cases, even in hard-to-reach areas of the ship's hold.

This object is achieved in accordance with the invention in that the bucket elevator has at least one releasable coupling point in its endless train of buckets, and that its lower section, which has a pulley means and which is joined to the feeder which supplies it with material, is fastened releasably to a main frame of the bucket elevator, so that the lower section of the bucket elevator is replaceable together with the feeder assembly. This replacement can be performed very rapidly, not only in the case of repairs, but also when one feeder assembly, e.g., one for the unloading of large ships, has to be replaced with another feeder for medium-sized ships, for example.

The releasable fastening of the lower section of the bucket elevator to its main frame can be a rigid fastening accomplished by means of a small number of quickly removable bolts.

In an embodiment that is preferred in the case of the need for easy maneuverability, however, the lower section of the bucket elevator is articulated to the main frame by means of at least one pin, and is able to be swung in relation to the main frame by means of a piston-and-cylinder system. In this case, the lower section of the bucket elevator is preferably able to be fixed at any desired position within an angular range of approximately ±15°.

For the universal use of the apparatus of the invention, the lower section of the bucket elevator is available in several forms, and the various forms are combined with different feeders, such as for example feeders having bucket wheels or having conveyor means circulating on an endless chain system, in which case all of the lower sections of the bucket elevator call for the same spacing between the lower pulley and the point of attachment to the main frame. The length of the bucket train of the bucket elevator is therefore adapted to all kinds of different feeder assemblies, and does not have to be changed when the lower section of the bucket elevator is replaced together with the feeder assembly.

Advantageously, the train of the bucket elevator is in the form of two endless chains, trough-shaped buckets being articulated to each linkage point in the two chains, and the distance between the linkage points of the chains being only slightly larger than the width of the bucket. In this case, it is desirable that the releasable coupling points on the two chains be disposed side by side and on the inner chain links, which can very simply be of divided construction and can be held together by plates bolted on both sides to the ends of the links.

An especially rapid and simple release of the attachment of the lower section of the bucket elevator to its main frame can be achieved if two pins are provided for the releasable joining of the lower section to the main frame, these pins being linked to the two piston rods of a double acting hydraulic cylinder and being displaceable by the action thereof.

It is desirable for all types of feeder assemblies to have two identical feeders disposed symmetrically with the main frame, and for these to feed the material from both sides into the lower section of the bucket elevator which extends downward to within reach of the feeder assemblies. High feeding and elevating rates are thus made possible. Furthermore, desirable stress conditions are achieved.

For the unloading of very large ships, it is desirable to use a feeder assembly having feeders which are in the form of two bucket wheels disposed one on each side of the pulley means of the lower section of the bucket elevator.

It is advantageous in this case for the pulley means and the two bucket wheels to be mounted coaxially on a secondary frame joined to the main frame. The secondary frame advantageously will have a box cross section and the two bucket wheels will advantageously have each its own motor and its own drive, the drives being housed within the box cross section. Thus good protection is provided for the drives, which is important in case the feeder should be introduced into ship hatchways in an incautious manner.

For the unloading of medium-size or smaller ships, it is advantageous to use a feeder assembly which has two feeders articulated in an off-center manner to the lower section of the bucket elevator and which can be swung into various feeding positions by means of a piston-and-cylinder system. Each of the two feeders should then have conveyor means, such as buckets or scrapers, circulating on an endless chain system.

By means of feeders having buckets circulating on an endless chain system, the coarser bulk materials, such as metal ores or coal, can be fed into the bucket elevator; it is mainly the more difficult to handle bulk materials, such as asbestos, that have solidified in transport, that can be handled with feeders provided with scrapers circulating on an endless chain system.

The two chain systems of the feeders advantageously have each an upper and a lower pulley means in a conventional manner, and these pulley means are best mounted on a common frame, the swing axis of the feeder means being at the same time the axis of the upper pulley means.

Advantageously, the frame is formed of at least two parts telescoping together, and of the shaft of the two upper pulley means and the shaft of the two lower pulley means. To permit the chain systems of the feeders to be tightened to the necessary degree, it is furthermore desirable for the lower telescoping part to be displaceable with respect to the upper telescoping part by means of a piston-and-cylinder device.

It is advantageous for the upper two pulley means to be driven by at least one motor and for each of them to be driven by its own drive fastened to the upper telescoping part situated in the middle between the two feeders, each drive turning a bull wheel mounted on a drive shaft of the upper pulley means.

BRIEF DESCRIPTION OF THE DRAWINGS

The invention will be further explained with the aid of the drawings, wherein:

FIG. 1 is an overall view of an apparatus in accordance with the invention for the unloading of ships, FIG. 2 shows the unloading of a large-size ship being performed with a shoveling device known as a feeder lowered into its hold; an articulated arrangement of a feeder assembly depending from the lower part of a bucket elevator is shown on the left side, and a rigid arrangement of same is shown on the right, FIG. 3 shows another feeder assembly depending from a bucket elevator unloading a medium size or smaller ship, FIGS. 6 and 7 are respectively a side elevational view and a front view of a feeder assembly together with the lower section of a bucket elevator, FIG. 10 is a view of a third embodiment of the feeder assembly, and FIG. 11 is a cross sectional view taken along line XI—XI of FIG. 10.

DETAILED DESCRIPTION OF THE INVENTION

Figure 4:
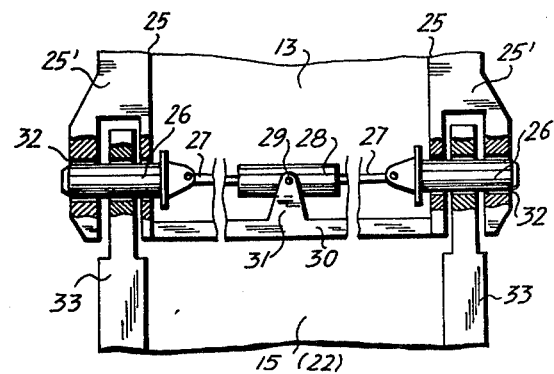
FIG. 4 is a front view of an important detail of the apparatus.

The ship unloading apparatus represented in a side elevation in FIG. 1 has a crane 2 which can travel parallel to the dock 1. A carriage 5 can be driven transversely of the dock 1 by means of a cable 3 which is passed around a winch 4. A boom 7 is articulated at 6 on the carriage 5, and can be raised and lowered by means of a cable 9 by the rotation of a winch 10. A top support 11 is articulated to the end 8 of the boom 7 and is attached to a transverse support 12. The main frame of an endless bucket elevator 13 is mounted for rotation about its axis at the upper end of the top support 11 and in the transverse support 12. The bucket elevator 13 has a lower section 15 which is releasably fastened at 14 to its main frame. The lower section 15 is joined to a feeder assembly 16. The latter is constructed with bucket wheels which shovel up the bulk material and feed it to the bucket elevator 13. The bucket elevator 13 conveys the bulk material upward, and the bulk material then passes over circular conveyors not shown in the drawing, which are disposed in the upper portion of the main frame, and over a conveyor running over the boom 7 to the desired place of storage.

The lower section 15 of the bucket elevator 13 together with the feeder 16 can be pivoted on the upper section of the bucket elevator by means of a piston and cylinder device. The system composed of the top support 11, the transverse support 12, the entire bucket elevator 13 and the feeder 16 is capable of being swung by means of a piston-and-cylinder device 18, i.e., it can be moved from its perpendicular position shown in FIG. 1 to a slanting position on either side. The piston-and-cylinder device 18 is articulated at one end to the boom 7 and at the other end to the top support 11.

The boom 7 together with the top support 11, the bucket elevator 13 and the feeder 16 can be brought away from the working position in which the feeder 16 is in the hold 19 of a large ship, to a rest position which is indicated by broken lines in FIG. 1. To reach this position, the boom 7 has been moved rearward on the carriage 5 and its front end 8 has been raised. With the apparatus in the rest position indicated in broken lines, the ship that has been unloaded can move away from the dock 1 and another ship can move freely to the dock for unloading.

On the left side of FIG. 2, the lower section 15 of the bucket elevator 13, which bears the feeder 16, is shown in the ship's hold 19 in the inclined position. A maximum inclination of the lower section 15 amounting to ±15° with respect to the upper section of the bucket elevator 13 and a maximum inclination of the entire system formed by the top support 11, transverse support 12, bucket elevator 13 and feeder 16 amounting also to ±15° from the vertical, will generally suffice; the lower section 15 of the bucket elevator 13 together with the feeder 16 can therefore assume a maximum angle of inclination of approximately ±30° from the vertical, and in this inclined position it can be rotated as desired (by rotating the main frame of the bucket elevator 13 with respect to the supports 11 and 12), so that the feeder 16 can also reach the marginal areas of the ship's hold 19.

On the right side of FIG. 2 there is shown a simplified embodiment of the section of a ship unloading apparatus that can be lowered into the hold 19. In this embodiment, a lower section 15' of a bucket elevator 13 is rigidly fastened to a flange 21 of its main frame by means of a few, quickly removable bolts (indicated at 20). This embodiment can be used mainly for the unloading of large ships having easily accessible holds.

FIG. 3 shows another embodiment of a section of a ship unloading apparatus which can be lowered into a hold. In this case, a lower section 22 of a bucket elevator 13 is joined to a feeder 23 such as is used mainly for the unloading of medium-size or smaller ships. The feeder 23 is equipped with buckets circulating on an endless chain system, as will be explained further below (cf. FIGS. 8 and 9). The hold of this smaller ship is indicated at 24, and it is divided by horizontal decks 25. The feeder 23 can be pivoted about an axis which is laterally disposed on the bottom section 22 of the bucket elevator 13, the maximum angle of inclination amounting to about 0° to 90° from the vertical. In FIG. 3, the feeder 23 is shown in a virtually horizontal position, in which it can shovel the bulk material even out of this poorly accessible hold.

FIG. 4 illustrates the method of joining the main frame 25 of the bucket elevator 13 to its lower section 15 or 22, as seen from the left side in FIG. 1. Two pins 26 are provided for the releasable joining of these parts. These pins 26 are linked to the piston rods 27 of a double acting hydraulic cylinder 28. The hydraulic cylinder 28 is attached at 29 to lugs 31 on a cross member 30 of the main frame 25. The main frame 25 of the bucket elevator 13 has two side members 25' which are forked at their lower end and have eyes 32 for the admission of each pin 26. The bottom section 15 or 22 of the bucket elevator is suspended by lateral frame members 33 which are placed within the forked ends of the lateral members 25' of the main frame, being also provided with eyes for the admission of the pins 26. By the action of the double acting hydraulic cylinder 28, the two pins 26 can be drawn out of the eyes 32 of the outer side of the fork of the lateral member 25' and from the eyes of the frame members 33 whenever the lower section 15 or 22 of the bucket elevator is to be released from the main frame 25. The bottom section 15 or 22 of the bucket elevator 13 together with the feeder 16 or 23 fastened thereon is first set down on the ground before its connection with the main frame is released. After the couplings on the endless chain of the bucket elevator 13 remaining on the upper section thereof have been opened, as will be further explained below, and after the removal of the pins 26 from the eyes of the frame members 33, the upper section of the bucket elevator 13 can be removed from the lower section 15 or 22, as the case may be, and can be shifted to a different lower section 15 or 22 having a different feeder 16 or 23, which may be standing ready at some other place. There the couplings of the chain of the bucket elevator 13 can be rejoined and the pins 23 can be passed back through the eyes of the frame members 33 into the outer eyes 32 of the main frame members 25'. The replacement of the lower section 15 or 22 of the bucket elevator 13 together with the feeder 16 or 23 fastened thereto is thus completed.

Figure 5:
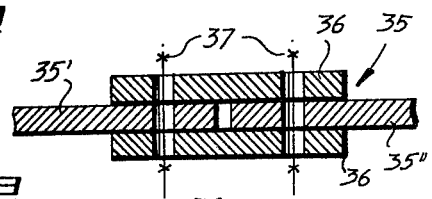
FIGS. 5 and 5a are cross-sectional and top plan views, respectively, of another important detail.

In FIG. 5 there is shown a cross section of a releasable coupling of the bucket train of the elevator 13. This train comprises, as shown more clearly in FIGS. 6 to 9, two endless chains 34. In FIG. 5, only one inner link 35 of such a chain is shown, this link being transversely divided and consisting of the parts 35' and 35". These parts 35' and 35" are held together by plates 36 disposed one on each side, and by bolts indicated at 37, which pass through matching holes in chain link parts 35' and 35" and the plates 36.

Figure 5A:
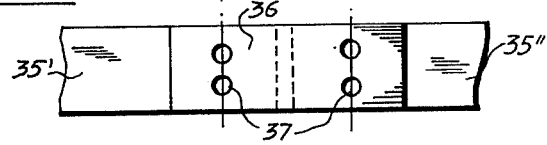

FIG. 5a is a top view of the coupling provided on the inner chain link 35.

The releasable couplings shown in FIGS. 5 and 5a are disposed side by side on the two chains 34 of the bucket train. It is advantageous to provide a plurality of such couplings along the length of the bucket train 13, so that, if a pair of couplings needs to be opened, it will not be necessary to run the bucket elevator 13 for such a long time to bring a pair of couplings within reach.

FIGS. 6 and 7 show in greater detail the section which can be lowered into a ship's hold 19 from a ship unloading apparatus in accordance with FIG. 1, FIG. 6 being a view similar to FIG. 1, and FIG. 7 being a view taken at 90° to FIG. 6. It can be seen that the feeder 16 has two identical feeders 38 disposed in symmetry with the main frame 25 and the center line, which feed material from both sides through a chute 39 to the bottom section 15 of the bucket elevator which extends to within reach of the feeder 16. The two feeders 38 are in the form of bucket wheels. In FIG. 6, the front bucket wheel 38 has been omitted for clarity.

The bottom section 15 of the bucket elevator 13 has a pulley means in the form of guides 40 in which run the rollers 40' of the train of the bucket elevator 13 comprising the two chains 34. A trough-shaped bucket 41 is suspended from each joint of the two chains 34. FIG. 6 shows that the distance between the joints of the chains 34 is only slightly greater than the trough diameter of the buckets 41. The pulley means 40 and the two bucket wheels 38 are journaled on the same axis 43 with the frame 42 attached at 26 to the main frame 25. The members 33 of the frame 42 are releasably articulated to the members 25' of the main frame 25, as was explained above in conjunction with FIG. 4.

The frame 42 has a box cross section. The two bucket wheels are driven each by its own motor 44 and its own drive 45. Each motor 44 is fastened within a protective casing 44' to the frame member 33, and through shafts 46' and 46" and a bevel gear 47 mounted on shaft 46" it drives another bevel gear 48 mounted on a drive shaft 49 of the drive 45. The drive shaft 49 drives through two spur gears 50 and 51 a second shaft 52 which in turn, by means of a gear 53 mounted on it, drives a bull wheel 55. The bull wheel 55 is mounted on another shaft 56 which is in line with the axis 43 of the bucket wheel 38 and lower pulley means 40. On the end of the shaft 56 projecting inwardly from the frame 42, a gear 57 is fastened, which is joined to the bucket wheel 38 by means of bolts indicated at 58.

In FIG. 7 there is shown a cross section of the left portion of the frame 42, so that the drive 45 is visible. The lower and upper parts of the frame 42 are releasably joined together by bolts indicated at 60 in FIG. 6 which pass through flanges 59. The distance between the bottom pulley means 40 of the bucket elevator 13, i.e., the axis 43, and the point at which the bottom bucket elevator section 15 is fastened to the main frame 25 (bolts 26) amounts to h.

Figure 8:
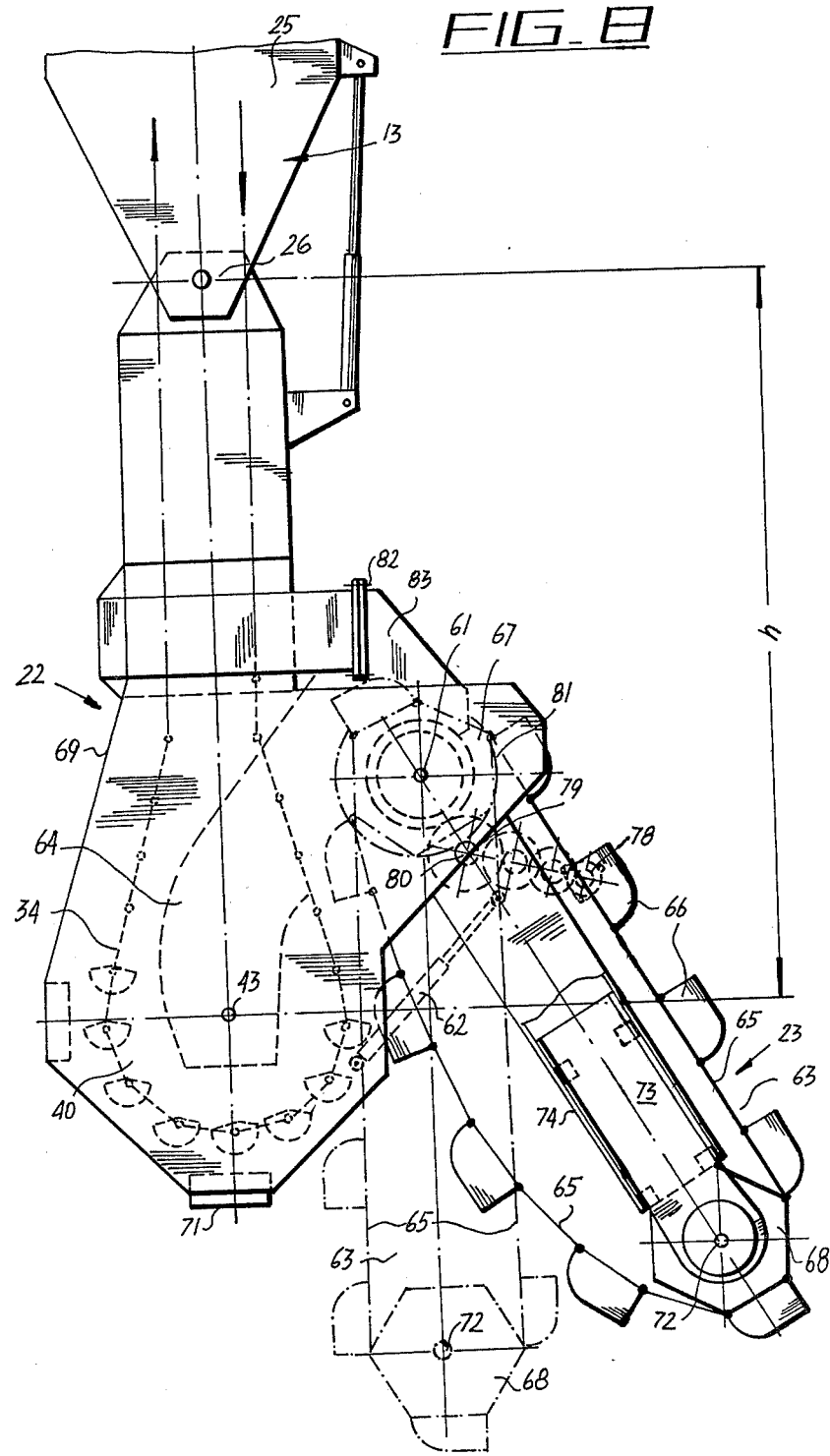
FIGS. 8 and 9 are representations similar to FIGS. 6 and 7 of another feeder assembly.
Figure 9:
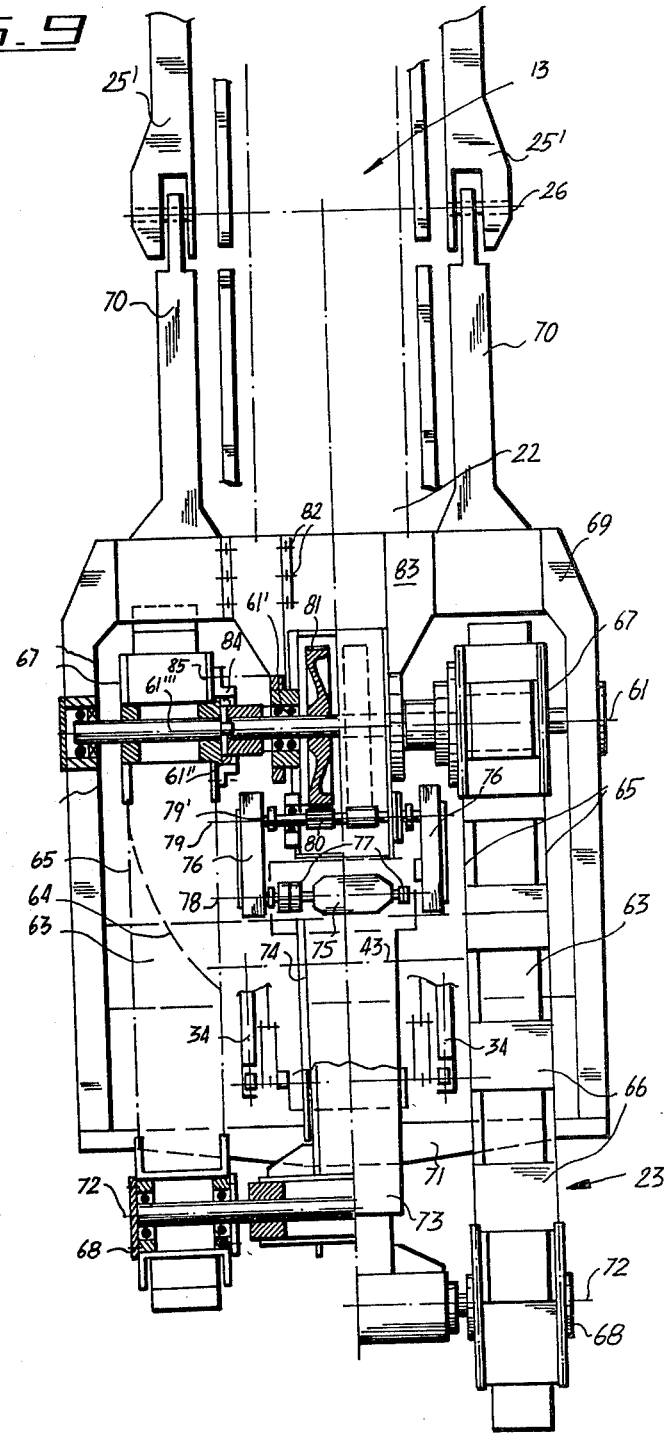

FIGS. 8 and 9 show in greater detail the section which can be lowered into a ship's hold from a ship unloading apparatus of FIG. 3, FIG. 8 being a view corresponding to FIG. 3 and FIG. 9 being a view of the left side of the apparatus shown in FIG. 8. The bucket elevator 13 in this embodiment has a differently designed lower section 22, at whose bottom end, however, a pulley means 40 for the two endless chains 34 is journaled on the axis 43 as in the case of the lower section 15 of the embodiment shown in FIGS. 6 and 7. The distance between the axis 43 and the bolts 26 amounts here again to h. This embodiment differs, however, from that of FIGS. 6 and 7 in that the feeder is articulated off to one side at 61 to the bottom section 22 of the bucket elevator 13, and can be swung into different shoveling positions by means of a piston and cylinder device 62. As shown especially in FIG. 9, two identical feeders 63 are disposed symmetrically to the longitudinal axis of the bucket elevator 13, and they feed material from both sides through a chute 64 to the lower section 22 of the elevator. In the embodiment shown in FIGS. 8 and 9, each of the two feeders 63 has buckets 66 circulating on an endless chain system 65.

Each chain system 65 is formed of two chains, each pair running over an upper pulley 67 and a lower pulley 68, and each pulley being in the form of two sprockets joined together. The upper pulleys 67 of the feeders 63 disposed one on the left and one on the right (FIG. 9) are mounted on the common shaft 61 which simultaneously is the axis on which pivots the entire feeder assembly 23 consisting of the two feeders 63, and this shaft is in turn mounted in a frame 69 of the lower bucket elevator section 22. The lateral members 70 of the frame 69 are joined to the lateral members 25' of the main frame 25 by bolts 26, in a manner similar to that represented in FIG. 4 in the case of the embodiment represented in FIGS. 6 and 7. This embodiment, however, differs with respect to the frame 42 of that embodiment, in that the frame 69 terminates in a bottom cross member 71 so as to have the necessary stability.

The lower pulleys 68 of the two feeders 63 are mounted on a common shaft 72 in a manner similar to that described in connection with the upper pulleys 67. The shafts 61 and 72 are connected together in the middle area between the two feeders 63—as shown in the case of the right-hand feeder 63 in FIG. 8—by parts 73 and 74 which are telescoped together so that the shafts 61 and 72 form together with the telescoping parts 73 and 74 a frame in which the upper and lower pulleys 67 and 68 are journaled. The lower telescoping part 73 is displaceable with respect to the upper telescoping part 74 by a piston and cylinder means which is not represented in the drawing, so as to permit the chains 65 of feeders 63 to be tightened to the necessary degree. The frame 61, 72, 73 and 74 is pivotable about the axis 61 by means of the piston and cylinder device 62. The two feeders 63 are held together by this frame and thus form a feeder assembly 23 which can be pivoted as a whole with respect to the bucket elevator 13. The two feeders 63 have been represented in FIGS. 8 and 9 in different positions for ease of comprehension, although actually—as stated—they must always assume the same position.

The chain system 65 of each of the feeders 63 is driven by the upper pulley 67 which is formed by two sprockets joined together. A motor 75 and two drives 76 are provided for the feeders 63 and are fastened to the upper telescoping part 75 located in the middle between the feeders 63. In FIG. 9, resilient couplings between motor 75 and drives 76 are indicated at 77, and the drive shaft of the drive 76 is indicated at 78 and its output shaft at 79. The individual gears of the drive 76 can be seen in FIG. 8. On the output shaft 79 of the drive 76 is a toothed coupling 79' which drives a pinion shaft 80 and thereby drives two bull wheels 81 which are fastened on a drive shaft 61' of the upper pulley 67 lying along the axis 61. The drive shaft 61' is mounted both in the parts 83 which are fastened by means of bolts 82 to the frame 69, and in the upper telescoping part 74 of the feeder 23, the upper telescoping part 74 being pivoted between two parts 83. The drive shaft 61' has on its end a hollow shaft section 61" provided with external teeth, which drives the upper pulley 67 through a hub 84 provided with internal teeth. The hub 84 is joined by the bolts indicated at 85 to one of the two sprockets of the upper pulley 67. The pulley 67 is mounted on a shaft 61''' which also lies on the axis 61 and is mounted at one end in the frame 69 and at the other, tapered end within the hollow shaft section 61".

In FIG. 9, the above-described mounting of the upper pulley 67 and of the bull wheel 61 driving same is represented in cross section in the case of the left-hand feeder 63 and in front elevation in the case of the right-hand feeder 63, as well as the mounting of the lower pulley 68 on the shaft 72 mounted in the lower telescoping part 73.

Instead of the feeder assembly 23 having buckets 65 circulating on endless chain systems 65 as shown in FIGS. 8 and 9, a feeder can be used which has scrapers 86 instead of the buckets 66, but which otherwise is the same in every respect as the feeder assembly 23. FIG. 10 shows a detail of such a feeder, namely one of the two chain systems 65' circulating around the sprockets 67 and 68. FIG. 11 shows the construction of the chain system 65' and of the scrapers 86. The chain system 65 consists again of two chains running parallel and joined together by link pins 87 spaced the same as the scrapers 86. Each link pin 87 is affixed to a plurality of spaced cylinders 88. Other cylinders 88, which are affixed to the scraper 86, alternate on the link pins with the cylinders 88 in the manner of a knuckle joint hinge. The scrapers 86 have an angular profile comprising a base plate 86' running parallel to the chains 65' and a plate 86" perpendicular thereto.

As furthermore shown in FIG. 11, the link pin 87 extending all the way between the two chains 65' is provided at each of its extremities with a roller 90 journaled thereon. The roller 90 runs within a guide 91 which, in a manner which is not shown, is joined to the frame 61, 72, 73, 74 of the feeder. The guides 91 are disposed on each side of each chain system 65' along the upper run of the chain system; for the bottom run, no guide is provided since here a certain dropping of the chain 65' is desirable in operation.

It will be appreciated that the instant specification and claims are set forth by way of example and not limitations, and that various changes and modifications may be made thereto without departing from the spirit and scope of the present invention.

What is claimed is:

1. In an apparatus for the continuous unloading of ships, having a traveling crane and a boom disposed thereon for raising and lowering a feeding unit for bulk material that is to be unloaded and a bucket elevator fed by the feeding unit, the improvement wherein the bucket elevator comprises a main frame pivotally connected to the boom, a lower section including pulley means rotatable about a pulley axis and having the feeder unit connected thereto to form a feed assembly, means releasably connecting the lower section at a given point to the main frame, an endless bucket train coactive with the pulley means and having at least one releasable coupling to engage and disengage same therefrom, wherein the feed assembly is removable from the main frame upon the uncoupling of the bucket train and the releasing of the lower section from the main frame and replaceable by another such assembly including a lower section having the same distance between the pulley axis and the given point.

2. Apparatus of claim 1, wherein the means releasably connecting the lower section of the bucket elevator to the main frame comprises bolts rigidly fastening the two together.

3. Apparatus of claim 1, wherein the releasable connecting means includes means pivotably mounting the lower section of the bucket elevator to the main frame comprising at least one pin coinciding with the given point and means for swinging the lower section comprising a piston-and-cylinder device.

4. Apparatus of claim 3, wherein the swinging means includes means for fixing the lower section of the bucket elevator in any desired swing position with respect to the main frame within an angular range of approximately ±15°.

5. Apparatus of claim 1, wherein the feed assembly includes a feeding unit comprising one of bucket wheels and conveyor means.

6. Apparatus of claim 1, wherein the train of the bucket elevator comprises two endless chains and trough-shaped buckets pivotably suspended from each chain link point of the two chains, and the distance between the link points of the chains being only slightly greater than the trough diameter.

7. Apparatus of claim 6, wherein the releasable coupling on the two chains are disposed side by side on the inner chain links.

8. Apparatus of claim 1, wherein the releasable connecting means comprises two pins for the releasable joining the lower section of the bucket elevator to the main frame, pivotally connected to two piston rods of a double-acting hydraulic cylinder and which are displaceable by the action thereof.

9. Apparatus of claim 1, wherein the feeding unit has two similar feeders disposed symmetrically with respect to the main frame and which feed the bucket train at the lower section from both sides thereof.

10. Apparatus of claim 9, wherein the feeders comprise two bucket wheels disposed one on each side of the pulley means of the lower section of the bucket elevator.

11. Apparatus of claim 10, wherein the lower section comprises a frame on which the pulley means and the two bucket wheels are coaxially mounted.

12. Apparatus of claim 11, wherein the frame has a box cross section and that the two bucket wheels each have a motor and a drive, the drives being housed within the box cross section.

13. Apparatus of claim 3 wherein the feeding unit comprises two feeders articulated to one side of the lower section of the bucket elevator.

14. Apparatus of claim 13, wherein each of the two feeders articulated at one side has circulating conveyor means comprising one of buckets and scrapers circulating on an endless chain system.

15. Apparatus of claim 14, wherein the two chain systems of the feeders each have an upper and a lower pulley means and that the pulley means are journaled on a common frame, the swing axis of the feeding unit being coincident with the axis of the upper pulley means.

16. Apparatus of claim 15, wherein the frame comprises at least two telescoping members connected to the shaft of the two upper pulley means and the shaft of the lower two pulley means.

17. Apparatus of claim 16, further comprising a piston and cylinder section for displacing the lower telescoping part in relation to the upper telescoping part.

18. Apparatus of claim 17, wherein the two upper pulley means are driven by at least one motor and each by a drive which are fastened to the upper telescoping part situated in the middle between the two feeders, each drive driving a bull wheel which is mounted on a drive shaft of the upper pulley means.

19. The apparatus according to claim 1, further comprising means for pivoting the main frame with an angular range of ±15° with respect to the vertical and wherein the means releasably connecting the lower section to the main frame includes means mounting same for pivotable movement about a pivot axis coinciding with the given point and means for pivoting the lower section within an angular range of ±15° with respect to the main frame.

* * * * *